INVENTOR.
DOMER SCARAMUCCI
BY
Dunlap and Laney
ATTORNEYS

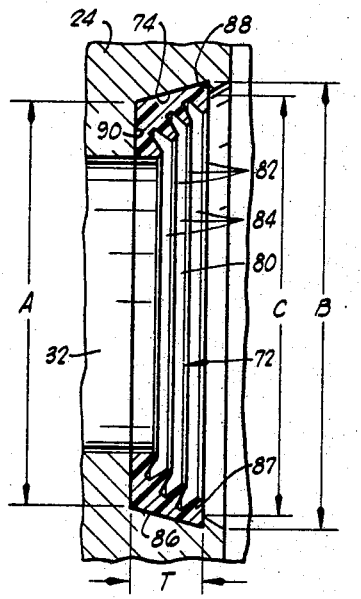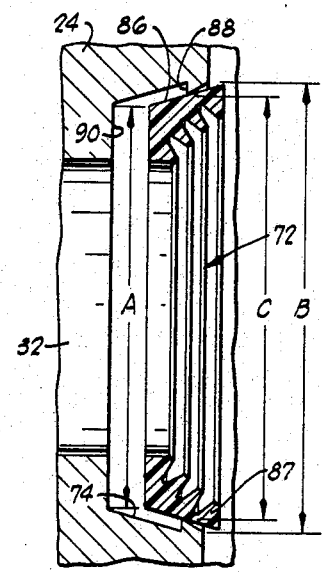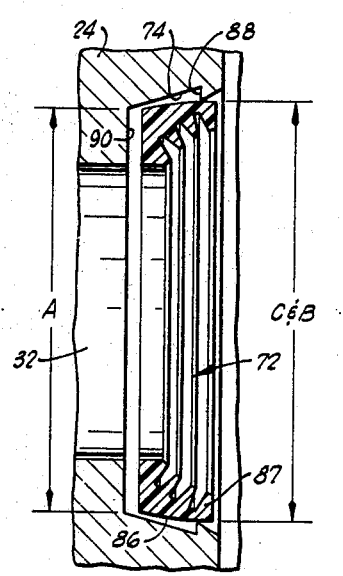
Fig. 2  Fig. 3  Fig. 4
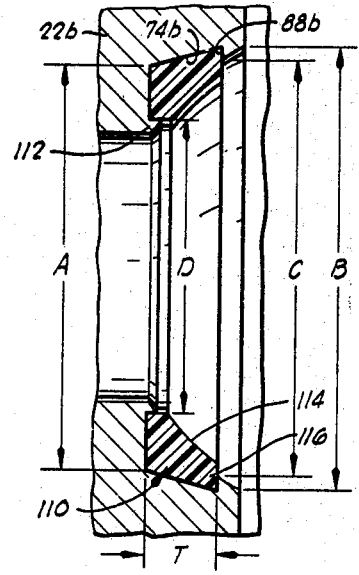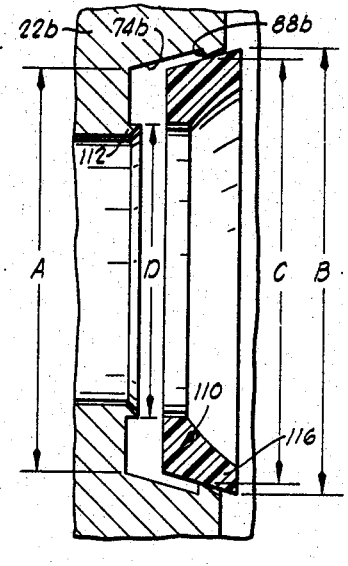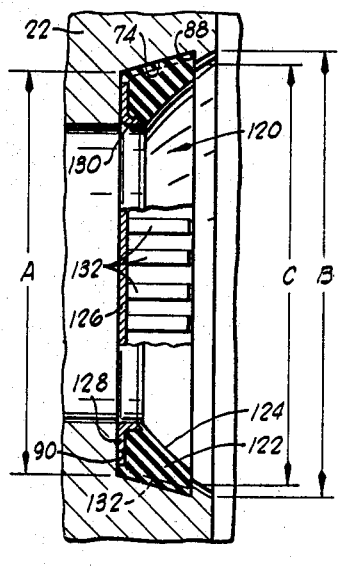
Fig. 7  Fig. 8  Fig. 9

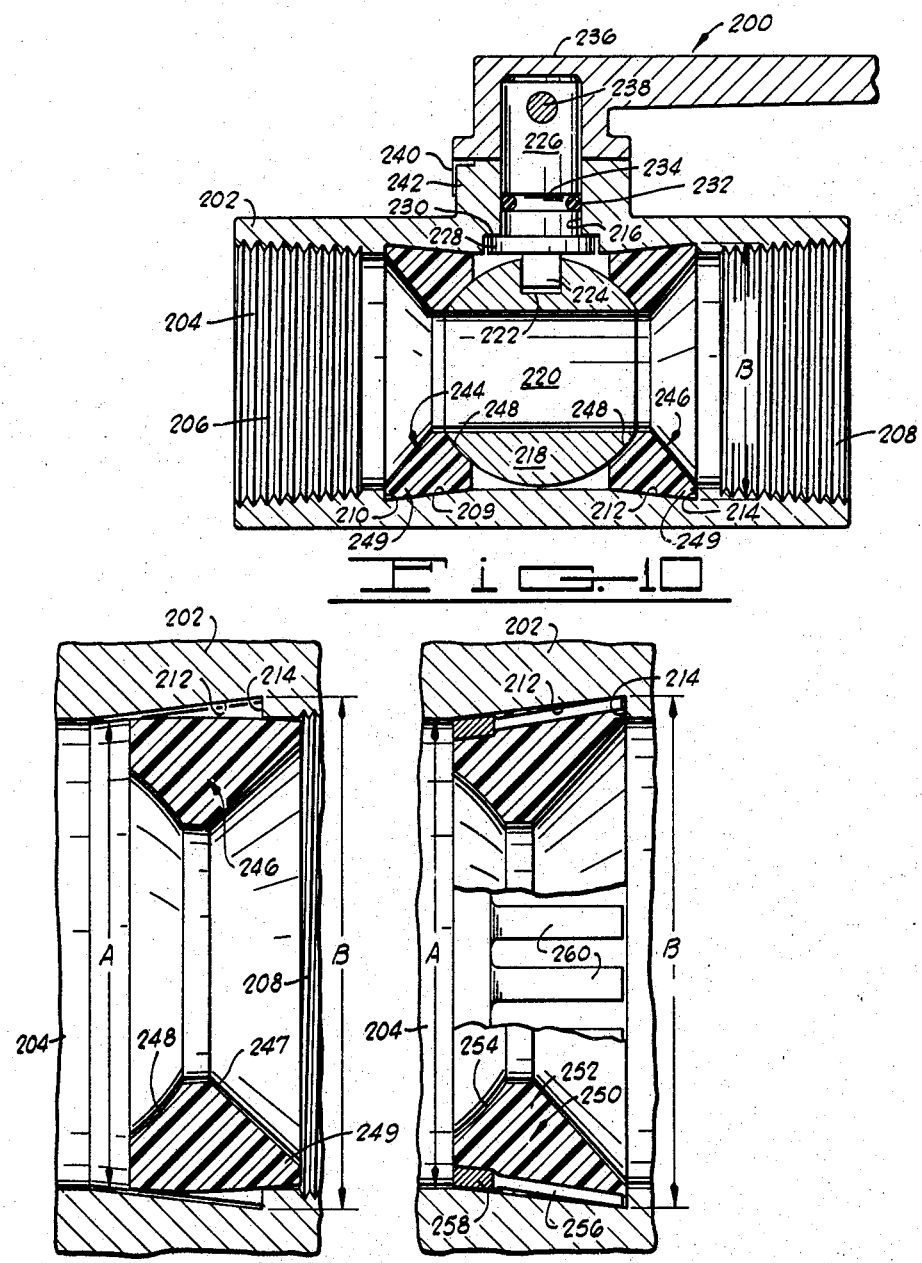

United States Patent Office 3,486,736
Patented Dec. 30, 1969

3,486,736
SNAP-IN BALL VALVE SEALS

Domer Scaramucci, Oklahoma City, Okla., assignor to Balon Corporation, Oklahoma City, Okla., a corporation of Oklahoma
Filed May 5, 1966, Ser. No. 547,859
Int. Cl. F16k 5/00, 25/00
U.S. Cl. 251—315                    12 Claims

ABSTRACT OF THE DISCLOSURE

To provide an improved valve wherein the annular seals may be snapped into place, thus facilitating and reducing the cost of construction, and wherein the annular seals and the mating annular groove are constructed such that the annular seals are effectively retained during operation of the valve, thus providing the positive sealing function.

---

This invention relates generally to improvements in ball valves. More particularly, but not by way of limitation, this invention relates to an improved seal and valve body structure for a ball valve.

Ball valves constructed in the past have generally included a valve body having a passageway extending therethrough, a spherically shaped valve member rotatably disposed in the passageway and, one or more annular seals encircling the passageway in engagement with the valve member and with the valve body. The annular seal or seals are arranged so that they are in sealing engagement with the valve body and the valve member when the valve member is rotated to a position closing the passageway.

One of the difficulties encounter in the construction of such valves has been in the retention of the annular seals in the valve body. Various forms of seal and valve body combinations have been constructed for the purpose of preventing the extrusion or displacement of the seals out of the valve body by fluid pressure. Most of these structures have included several cooperating parts arranged in the valve body and encompassing a portion of the annular seals. Manifestly, such arrangements have proved to be expensive even though they have been effective to retain the seals in the valve body.

Attempts have been made to reduce the cost of the valve by constructing annular grooves in the valve body whereby the seals are retained between shoulders formed by the grooves. In order to insert the seals in the grooves, the seals have necessarily been constructed from very soft, resilient materials that effectively seal only when the valve is utilized in relatively low pressure service installations.

Generally, this invention provides an improved valve including: a valve body having a bore extending therethrough, an annular groove encircling a portion of the bore forming an annular shoulder therein; a valve member movably disposed in the valve body, the valve member being movable from a position opening the bore to a position closing the bore; and, resilient annular seal means at least partially disposed in the annular groove and encircling the bore, the seal means including an outer periphery having a first diameter not greater than the inner diameter of the annular shoulder and a second diameter greater than the inner diameter of the annular shoulder and disposed in the annular groove to retain the seal means in the valve body, the seal means also including a surface arranged to sealingly engage the valve member.

One object of the invention is to provide an improved valve wherein the annular seals are effectively retained therein.

Another object of the invention is to provide an improved valve wherein relatively hard, yet, resilient seals are effectively retained in the valve body.

One other object of the invention is to provide an improved valve incorporating annular seals that may be quickly and easily installed and, yet, are effectively retained in the valve.

A further object of the invention is to provide an improved ball valve having retained annular seals that can be quickly, easily and economically manufactured.

The foregoing and additional objects and advantages of the invention will become more apparent as the following detailed description is read in conjunction with the accompanying drawings wherein like reference characters denote like parts in all views and wherein:

FIGS. 2, 3 and 4 are enlarged, fragmentary cross-sectional views of a portion of the valve of FIG. 1 illustrating the arrangement of one of the annular seals and a portion of the valve body and the method for inserting the seal in the valve body;

FIGS. 7 and 8 are enlarged, fragmentary cross-sectional views of a modified form of the ball valve of FIG. 1, illustrating the arrangement and construction of an additional embodiment of annular seal and its method of insertion into the valve;

FIG. 9 is an enlarged, fragmentary cross-sectional view illustrating another embodiment of seal located in the ball valve of FIG. 1;

FIG. 10 is a vertical cross-sectional view of another embodiment of ball valve also constructed in accordance with the invention;

FIG. 11 is an enlarged, fragmentary cross-sectional view illustrating the method of inserting one of the seals in the ball valve of FIG. 10;

FIG. 12 is an enlarged, fragmentary cross-sectional view illustrating another embodiment of seal located in the ball valve of FIG. 10.

EMBODIMENT OF FIG 1

Figure 1:
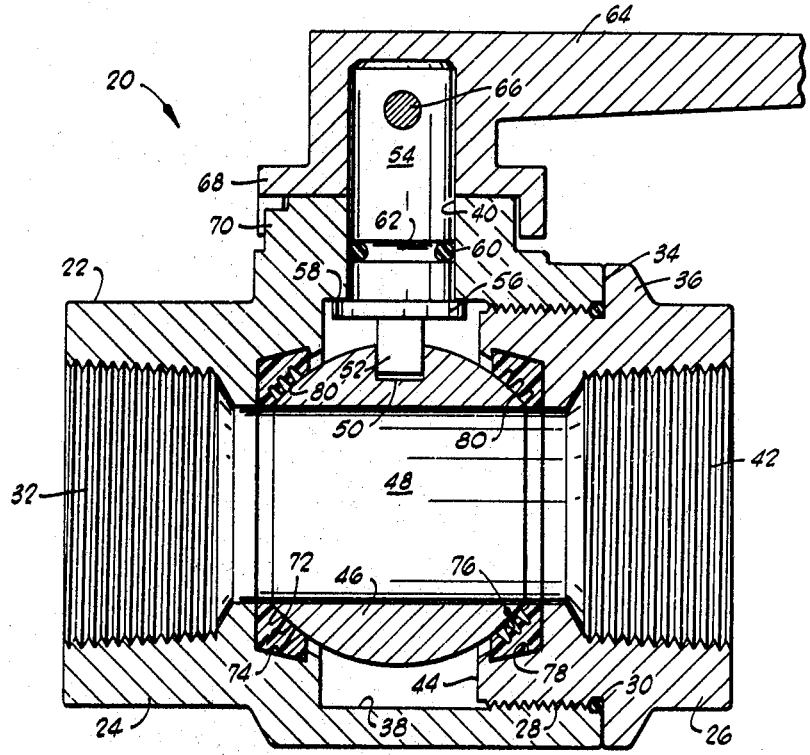
FIG. 1 is a vertical cross-sectional view of a ball valve constructed in accordance with the invention.

Referring to the drawings and to FIG. 1 in particular, shown therein and generally designated by the reference character 20 is a ball valve constructed in accordance with the invention. As shown therein, the ball valve 20 includes a valve body 22 comprising an inlet portion 24 and an outlet portion 26 that is connected with the inlet portion 24 by mating threads 28. An O-ring seal 30 is disposed between the inlet portion 24 and the outlet portion 26 to prevent the escape of fluid through the mating threads 28.

The inlet portion 24 includes a partially threaded bore 32 that extends therethrough intersecting an end face 34 that is in abutting relationship with an exterior flange 36 encircling the outlet portion 26. A counterbore 38 extends into the inlet portion 24 from the end face 34. An opening 40 extends transversely through the inlet portion 24 intersecting the counterbore 38.

The outlet portion 26 also includes a partially threaded bore 42 that extends therethrough intersecting an end face 44 thereon. It will be noted that the bores 32 and 42 combine to form a bore extending entirely through the valve body 22.

A valve member 46, which is illustrated as being spherical in configuration, has a flow port 48 extending therethrough that is arranged to be aligned with the bore extending through the valve body 22. The exterior surface of the valve member 46 is provided with a rectangular recess 50 that is sized to receive a rectangular lower end 52 on a valve operating member 54.

The valve operating member 54 extends through the opening 40 and includes an exterior flange 56 that is in engagement with a downwardly facing surface 58 on the inlet portion 24 to limit the upward movement of the valve operating member 54 relative to the valve body 22. An O-ring seal 60 is disposed in an annular groove 62 formed in the valve operating member 54. The O-ring seal 60 sealingly engages the valve operating member 54 and the valve body 22 in the opening 40.

The upper end of the valve operating member 50 is connected with a valve handle 64 by a pin 66. The handle 64 includes a lug 68 that is arranged to engage one or more spaced abutments 70 (only one is shown in FIG. 1) on the inlet portion 24 to limit the rotation of the handle 64 and the interconnected valve member 46 to approximately 90 degrees.

An annular upstream seal 72 is disposed in an annular groove 74 formed in the inlet portion 24 of the valve body 22. An identical though oppositely disposed annular seal 76 is located in an annular groove 78 formed in the outlet portion 26. It should also be pointed out that the grooves 74 and 78 are identical in configuration though oppositely arranged in the valve body 22. In view of the identical construction of the seals 72 and 76 and the grooves 74 and 78, only the upstream seal 72 and the groove 74 in the inlet portion 24 will be described in detail.

The details of construction of the seal 72 and the groove 74 are more clearly shown in FIGS. 2, 3 and 4. As illustrated therein, the seal 72 includes a surface 80 comprising a series of lands and grooves 82 and 84, respectively.

A tapered outer periphery 86 defines a first diameter A and a second diameter B on the seal 72. It will also be noted that the seal 72 has a thickness T that is at least equal to the width of the annular groove 74.

The largest interior diameter on the seal 72 is adjacent the diameter B on the outer periphery 86 forming a relatively thin and flexible end 87 thereon. The flexible end 87 is provided so that the seal 72 can be relatively easily deflected for insertion into the groove 74 as will be explained more fully hereinafter.

The annular groove 74 forms an annular shoulder 88 in the inlet portion 24 that has an inner diameter C. Also, the annular groove 74 forms an oppositely facing shoulder 90 in the inlet portion 24 that has the bore 32 defining its inner periphery.

As to the relative diameters of the various portions of the seal 72 and the groove 74, it should be pointed out that the diameter A of the seal 72 may be equal to but not greater than the diameter C on the inner periphery of the shoulder 88. Also, the diameter B on the seal 72 is greater than the diameter C of the shoulder 88, whereby insertion of the seal 72 into the annular groove 74 retains the seal 72 in the inlet portion 24 of the valve body 22.

While the seals 72 and 76 may be constructed from relatively soft resilient materials, the preferred material utilized is a relatively hard, yet, resilient material, such as a high durometer natural or synthetic rubber or one of the high density synthetic resins, for example, nylon, Teflon or Delrin. The insertion of the annular seals into the annular grooves has been accomplished without undue difficulty when the seals have been constructed from relatively soft materials. However, the insertion of the annular seals into grooves when the seals are constructed from relatively hard materials has been extremely difficult if not impossible when utilizing seal and groove forms previously known.

As clearly shown in FIGS. 3 and 4, the diameter A of the seal 72 passes through the diameter C on the inner periphery of the shoulder 88 since the diameter A is not greater than the diameter C. Due to the tapered outer periphery 86 of the seal 72, the outer periphery 86 engages the inner periphery of the shoulder 88 when the diameter of the outer periphery 86 is equal to the diameter C. When this occurs, and additional force is exerted to move the seal 72 a farther distance into the annular groove 74, the relatively flexible end 87 of the seal 72 is deflected inwardly until the diameter B is equal to the diameter C as illustrated in FIG. 4.

Manifestly, continued force on the seal 72 moves the seal 72 relatively toward the shoulder 90 forcing the diameter B of the seal 72 past the annular shoulder 88 until it assumes the position illustrated in FIGS. 1 and 2. As might be expected, the resiliency of the material used in constructing the seal 72, causes the seal to resume the diameter B so that the seal 72 engages the shoulder 88 firmly locking the seal 72 in the annular groove 74.

In assembling the valve 20, the valve operating member 54 is inserted through the opening 40 and the upstream seal 72 inserted in the annular groove 74 as previously described. After the upstream seal 72 is in place, the valve member 46 is inserted into the counterbore 38 into operable connection with the valve operating member 54.

The downstream seal 76 is then inserted into the groove 78 in the outlet portion 26 as previously described in connection with the insertion of the upstream seal 72 into the annular groove 74. The outlet portion 26 is then screwed into the inlet portion 24 until the end face 34 on the inlet portion 24 abuts the exterior flange 36 on the outlet portion 26. When in this position, the surfaces 80 on the upstream and downstream seals 72 and 76 are in engagement with the exterior surface of the valve member 46 to initiate a seal therewith and to retain the valve member 46 in a centered position relative to the seals 72 and 76.

When it is desired to close the valve 20, the operating handle 64 is rotated. Through the interconnecting operating member 54, the valve member 46 is rotated until the flow port 48 extending therethrough is disposed at a right angle relative to the bore extending through the valve body 22, that is, into the position illustrated in FIG. 5. Fluid pressure in the opening 32 exerts a force on the valve member 46 and may, due to a slight downstream movement of the member 46 pass between the surface 80 on the upstream seal 72 and the exterior surface of the valve member 46. When this occurs, fluid pressure is present in the counterbore 38 (see FIG. 1).

Figure 5:
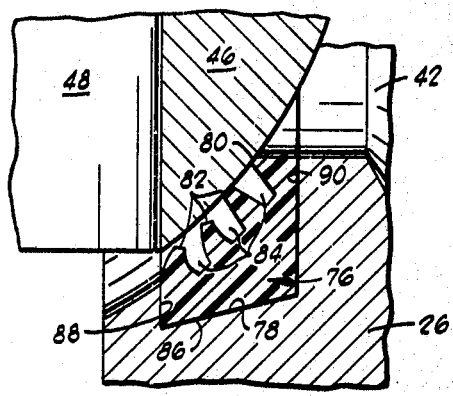
FIG. 5 is an enlarged, fragmentary cross-sectional view illustrating the operation of one of the seals in the valve of FIG. 1.

As clearly shown in FIG. 5, and assuming that the fluid pressure is sufficiently high, the first and second lands 82 on the downstream seal 76 are deflected relatively away from the exterior surface of the valve member 46, permitting fluid to flow thereby. Assuming that the lands 82 are of equal strength, their sealing effect with the valve member 46 will be cummulative. That is, if the required pressure for deflecting each of the lands is 100 p.s.i., it will require 100 p.s.i. to deflect the first land 82, 200 p.s.i. to deflect the first and second lands 82 and 300 p.s.i. to deflect the first, second and third lands 82, etc. Thus, the particular arrangement of seal described is effective to form a fluid-tight seal with the valve member 46 even when relatively high pressures are present in the counterbore 38.

Frequently, in previously constructed valves, the upstream seal is forced by fluid pressure out of its desired position in the valve body, resulting in destruction of the seal upon subsequent operation of the valve or in severely binding the valve member whereby excessive torque is required to rotate the valve member. Manifestly, in the structural arrangement of seals and valve body described herein, the seals are retained in their proper positions thus avoiding the difficulties encountees by prior art valves.

Also, it should be pointed out that the direction of fluid flow through the valves is immaterial since both the upstream seal 72 and the downstream seal 76 are disposed in identical though oppositely disposed annular grooves 74 and 78 whereby each of the seals 72 and 76 is retained. Manifestly, and even though the seals 72 and 76 are retained against displacement by fluid pressure, they may be easily replaced as previously described upon disassembly of the valve 20.

EMBODIMENT OF FIG. 6

Figure 6:
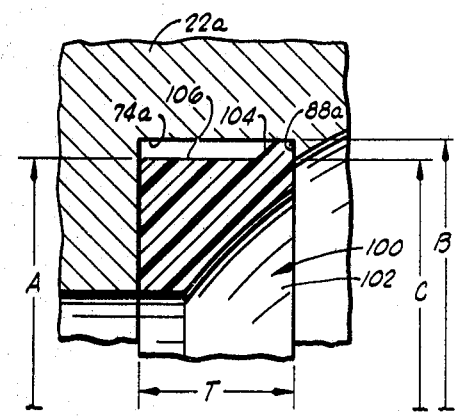
FIG. 6 is an enlarged, fragmentary cross-sectional view illustrating another embodiment of seal located in a modified form of the ball valve of FIG. 1.

The enlarged, fragmentary cross-sectional view of FIG. 6 illustrates another embodiment of seal generally designated by the reference character 100 that can be utilized in the valve 20. As shown therein, the valve body has been modified and is designated by the reference character 22a. The modification consists of forming the annular groove 74a with a generally rectangular cross section rather than with the tapered configuration as illustrated in FIG. 1 by the annular grooves 74 and 78.

The annular groove 74a forms an annular shoulder 88a on the valve body 22a. As clearly illustrated in FIG. 6, the shoulder 88a has an inside diameter C.

The seal 100 has a thickness T that is preferably equal to the width of the annular groove 74a. Also, the seal 100 includes a surface 102 that is arranged to sealingly engage the exterior surface of the valve member 46 (see FIG. 1).

An annular flange 104 extends radially outwardly from the outer periphery 106 of the seal 100 and is disposed in the annular groove 74a. The outer periphery 106 of the seal 100 has a diameter A that is equal to or smaller than the diameter C of the inner periphery of the shoulder 88a. The annular flange 104 has an outer diameter B that is greater than the diameter C of the inner periphery of the shoulder 88a.

The seal 102 is inserted in the annular groove 78a as previously described in connection with the insertion of the seal 72 into the groove 74. However, it will be noted that the outer periphery 106 slides easily into the annular groove 74 until the annular flange 104 engages the valve body 22a adjacent the shoulder 88a. When this occurs, additional force exerted on the seal 100 deflects the flange 104 relatively inwardly (not shown) until the seal 100 coincides with the annular groove 74a. In this position, the resiliency of the material used in forming seal 100 returns the annular flange 104 to its original configuration, that is, to the position illustrated in FIG. 6 whereupon the flange 104 engages the shoulder 88a to lock the seal 100 in the annular groove 74a.

Thus, it can be appreciated that the seal 100 can be constructed from the relatively hard, yet, resilient material as previously described in connection with the seals 72 and 76. The seals can be constructed from such materials since the only deformation necessary to place the seals in the grooves occurs adjacent the relatively flexible end thereof. It should be emphasized however that the materials used in forming the seals are not sufficiently flexible to permit the seals to be displaced from the annular groove 74a once they are disposed therein.

EMBODIMENT OF FIG. 7

The fragmentary cross-sectional view of FIG. 7 illustrates another embodiment of annular seal that can be utilized in the valve 20. The seal is generally designated by the reference character 110.

It will be noted that FIG. 7 illustrates a modified embodiment of the valve body 22b. The modification consists of the provision of an axially extending flange 112 that overlies a portion of the annular groove 74b. The axial flange 112 has an outer diameter D that is equal to the diameter of the inner periphery of the annular seal 110.

The annular seal 110 includes a surface 114 that is arranged to sealingly engage the exterior of the valve member 46 (see FIG. 1). It will be noted in FIG. 7 that the outer periphery of the annular seal 110 is tapered as the annular seals 72 and 76. The outer periphery of the seal 110 has a diameter A on one end and a larger diameter B on the opposite end thereof. The seal 110 has a thickness T which is equal to the width of the annular groove 74b formed in the valve body 22b. The configuration of the surface 114 provides a relatively flexible end 116 on the seal 110.

The modified valve body 22b is also provided with the shoulder 88b having an inner diameter C. The inner diameter C is equal to or greater than the diameter A of the outer periphery of the annular seal 110 and is smaller than the larger diameter B on the outer periphery of this seal 110.

As shown in FIG. 8, the seal 110 is partially inserted into the annular groove 74b. It will be noted therein that the diameter of the inner periphery of the seal 110 and the outer diameter D of the axial flange 112 are equal so that the seal 110, even though distorted slightly for insertion into the annular groove 74b, fits easily into the groove 74b.

Since the diameter C of the inner periphery of the annular shoulder 88b is larger than the diameter A on the small end of the seal 110, the seal 110 slips easily thereby until the diameter of the tapered outer periphery of the seal 110 is coincident with the diameter C.

At this time, additional force must be exerted on the seal 110 to force it past the shoulder 88b. As the additional force is exerted thereon, the relatively flexible end 116 on the seal 110 is deflected relatively inwardly adjacent the larger diameter B until the diameters B and C are equal. When this occurs, the seal 110 moves into the annular groove 74b and the seal 110, due to its resiliency, returns to its original size as illustrated in FIG. 7 with the seal in engagement with the annular shoulder 88b and the axial flange 112, thereby locking the seal 110 in the valve body 22b.

Manifestly, the advantages described in connection with the other embodiments of annular seal are afforded by the seal 110. In addition, the axial flange 112 provides an additional reinforcing to support and lock the seal 110 in the valve body 22b.

EMBODIMENT OF THE FIG. 9

The fragmentary cross-sectional view of FIG. 9 illustrates another embodiment of seal that is generally designated by the reference character 120 and that is also constructed in accordance with the invention. The seal 120 is arranged to be utilized in the valve 20.

The seal 120 includes a resilient annular member 122 having a surface 124 thereon arranged to engage the exterior surface of the valve member 46 (see FIG. 1). A relatively rigid annular reinforcing member 126 encircles a portion of the annular member 122 and is preferably embedded therein during the manufacture of the seal 120.

As clearly illustrated in FIG. 9, the annular reinforcing member 126 includes an annular portion 128 that is in abutment with the shoulder 90 formed in the valve body 22. An axial flange portion 130 extends from the inner periphery of the annular portion 128 in overlying relationship with a portion of the annular member 122.

As shown most clearly in the broken out portion of FIG. 9, a plurality of finger-like portions 132 project from the annular portion 128 at spaced points along the diameter A of the seal 120 relatively toward the diameter B thereon. As might be expected, the finger-like portions or tines 132 are resilient to permit the inward deflection of the larger end of the seal 120 as it is inserted in a groove 74 past the diameter C on the annular shoulder 88.

In view of the provision of the relatively rigid, yet, resilient annular reinforcing member 126, the annular seal member 122 can be constructed from a relatively soft and resilient material, such as natural or synthetic rubber having a relatively low durometer.

Manifestly, the seal 120, due to the resiliency provided in both the seal member 122 and in the reinforcing member 126, is easily inserted into the annular groove 74. The seal 120 is locked in position in the annular groove 74 due to the engagement of the larger diameter end thereof with the annular shoulder 88 in the valve body 22. Also, the arrangement of the reinforcing member 126 provides support for the annular member 122 to prevent its extrusion or displacement under fluid pressure from the annular groove 74 even though the annular member 122 is constructed from a relatively soft material.

EMBODIMENT OF FIG. 10

The vertical cross-sectional view of FIG. 10 illustrates another embodiment of ball valve generally designated by the reference character 200 and also constructed in accordance with the invention. As shown therein, the valve 200 includes a valve body 202 having a bore 204 extending therethrough.

An inlet end 206 of the valve 200 is partially threaded and at outlet end 208 thereof is also partially threaded. The threads are provided to connect the valve 200 in a fluid circuit (not shown).

The valve body 202 includes an annular groove 209 forming a shoulder 210 adjacent the inlet end 206 and generally facing the outlet end 208. A second annular groove 212 is provided in the valve body 202 forming a shoulder 214 that is disposed adjacent the outlet end 208 and generally facing the inlet end 206. An opening 216 extends transversely through the valve body 202 intersecting the bore 204.

A valve member 218, which is illustrated as being spherical in configuration, is disposed in the bore 204 and has a flow port 220 extending therethrough. The exterior of the valve member 218 is provided with a rectangular recess 222 that is sized to receive a rectangular end 224 of a valve operating member 226.

The valve operating member 226 is disposed in the opening 216 and has an exterior flange 228 thereon arranged to engage a downwardly facing surface 230 in the valve body 202 to limit the upward movement of the valve operating member 226 in the valve body 202.

An O-ring seal 232 is disposed in an annular groove 234 formed in the valve operating member 226. The O-ring seal 232 sealingly engages the valve operating member 226 and the valve body 202 in the opening 216.

The upper end of the valve operating member 226 is connected with a valve handle 236 by a pin 238. The valve operating handle 236 includes a lug 240 that is arranged to engage spaced abutments 242 (only one is shown in FIG. 1) on the valve body 202 to limit the rotational movement of the valve handle 236 and the interconnected valve member 218 to approximately 90 degrees.

An annular upstream seal 244 is disposed in the valve body 202 and is located partially in the annular groove 209. An annular downstream seal 246 is disposed in the valve body 202 adjacent the outlet end 208 thereof and is partially located in the annular groove 212.

The seals 244 and 246 are identical in construction though oppositely disposed in the valve body 202. For this reason, only the downstream seal 246 will be described in detail.

As shown most clearly in FIG. 11, the annular downstream seal 246 includes a surface 248 located adjacent a small end thereof that has a diameter A. The diameter A is substantially equal to the diameter of the bore 204. The surface 248 is configured to sealingly engage the exterior surface of the valve member 218 as clearly shown in FIG. 10.

The outer periphery of the seal 246 is tapered as shown in FIG. 10 extending from the diameter A to a relatively large diameter B. The diameter B is substantially equal to the largest diameter of the annular groove 212, that is, the diameter B is substantially equal to the diameter of the annular groove 212 adjacent the shoulder 214.

A tapered interior surface 247 on the seal 246 slopes outwardly toward the diameter B forming a relatively flexible end 249 thereon. The flexible end 249 is provided to permit the seal 246 to be more easily inserted in the valve 200 as will be described more fully hereinafter.

The annular seals 244 and 246 are preferably constructed from a relatively hard yet resilent material, such as a relatively high durometer natural or synthetic rubber or one of the high density synthetic resins. Preferably, the seals 244 and 246 should have sufficient resiliency so that they can be deflected for insertion into the annular grooves 209 and 212 as will be described and to sealingly engage the valve member 218. In addition, the seals 244 and 246 must be of sufficient hardness to support the force exerted by the valve member 218 when a fluid pressure load is placed thereon.

The valve 200 is assembled by first inserting the valve operating member 226 through the bore 204 into the opening 216 and then inserting the valve member 218 into operable engagement with the valve operating member 226. After this has been accomplished, the seals 244 and 246 are inserted in the respective ends 206 and 208 of the bore 204 in the valve body 202 with the diameters A being inserted adjacent the valve member 218.

As clearly shown in FIG. 11, the diameter A, which as previously mentioned is substantially equal to the diameter of the bore 204, passes the annular shoulder 214 without difficulty. However, the tapered outer periphery of the seal 246 engages the valve body 202 resisting movement into the annular groove 212. Additional force is exerted on the seal 246, forcing the seal 246 past the shoulder 214 and deforming the relatively flexible end 249 adjacent the larger diameter B of the seal 246 inwardly.

When the large diameter B has passed the shoulder 214, the resiliency of the material utilized in constructing the seal 246 restores the seal to its original configuration in the annular groove 212 as illustrated in FIG. 10. When the seal 246 enters the groove 212, the seal 246 engages the shoulder 214 locking the seal 246 firmly in the valve body 202. The foregoing procedure is repeated for inserting the seal 244 into the annular groove 209.

It should be pointed out that the surface 248 on the seals 244 and 246 engages the exterior surface of the valve member 218 when the seals are located in the annular grooves 209 and 212, respectively. The engagement of the surface 248 with the valve member 218 initiates the sealing engagement between the seals 244 and 246 and the valve member 218 and in addition serves to retain the valve member 218 in a relatively centered position in the valve 200.

With the valve 200 assembled and with the valve member 218 in the open position as illustrated in FIG. 10, it can be appreciated that fluid flowing therethrough will exert little or no force tending to displace the seals 244 and 246 from their locations in the valve body 202. However, when the valve member 218 is rotated to the closed position (not shown), that is, to the position wherein the flow port 220 in the valve member 218 is disposed at a right angle relative to the bore 204, fluid pressure in the inlet end 206 of the bore 204 exerts a force on the valve member 218 tending to displace it relatively downstream. When this occurs, it can be appreciated that the force exerted thereby is transmitted through the downstream seal 246 to the shoulder 214, thereby preventing movement of the valve member 218, except to the small extent permitted by the resiliency of the seal 246.

Due to the relatively close fit between the seals 244 and 246 and the valve member 218, the upstream seal 244 cannot be displaced out of the annular groove 209 due to its engagement with the valve member 218. Therefore, the seals 244 and 246 will remain locked in the grooves 209 and 212 in the valve body 202.

Manifestly, the seal structure described permits the use of seals constructed from relatively hard, yet, resilient material that can be quickly and easily assembled in the valve 200 and that will remain locked in the desired position. As is clearly apparent from viewing FIG. 10, the valve 200 is of extremely simple construction and requires no additional structure to retain the seals 244 and 246 therein.

EMBODIMENT OF FIG. 12

The fragmentary cross-sectional view of FIG. 12 illustrates another embodiment of annular seal generally designated by the reference character 250 that can be utilized in the valve 200. As illustrated therein, the annular seal 250 includes a resilient annular member 252 having a surface 254 thereon arranged to sealingly engage the valve member 218 (see FIG. 10).

The seal 250 also includes an annular reinforcing member 256 that is, in the preferred form of the seal 250, embedded in the annular member 252. The annular reinforcing member 256 includes an annular portion 258 encircling the relatively small end of the seal 250, that is, adjacent the diameter A.

A plurality of finger-like portions or tines 260 extend from the annular portion 258 toward the relatively larger diameter B of the seal 250. It should be pointed out that the annular reinforcing member 256 is to be constructed from a relatively hard yet resilient material, whereby the finger-like portions 260 will have spring-like characteristics.

As illustrated in FIG. 12, the seal 250 is disposed in the annular groove 212 in the valve body 202. When disposed therein, the seal 250 is in engagement with the annular shoulder 214, thus supporting the seal 250 in the valve body 202 as previously described in connection with the seals 244 and 246.

When assembling the valve 200 with the seals 250, the tines 260 are deflected relatively inwardly as force is exerted on the seal 250 to move it into the bore 204 toward the annular groove 212. After the terminal ends of the tines 260 have passed the annular shoulder 214, their spring-like characteristics restore them to their original configuration, whereby they move into the larger diameter portion of the annular groove 212 and into engagement with the shoulder 214 of the valve body 202. Although the seal 250 is constructed somewhat differently from the seals 244 and 246, it can be appreciated that the seal 250 will function as previously described in connection with the seals 244 and 246 and will provide the advantages previously described.

From the foregoing detailed description of the seal forms, it can be appreciated that they are each relatively simply constructed and that they cooperate with annular grooves formed in the valve bodies described to effectively lock the seals in their desired positions in the valves. Manifestly, each of the structures described can be quickly, easily and economically constructed by well known manufacturing procedures, thus avoiding the usual expense incurred in providing relatively complex structures for retaining the seals in the valves.

What I claim is:

1. In a valve:
a valve body having a bore extending therethrough and an annular groove encircling a portion of said bore forming an annular shoulder therein;
a valve member movably disposed in said valve body, said valve member being movable from a position opening said bore to a position closing said bore; and
resilient, annular seal means having its entire outer periphery disposed in said annular groove and having a surface sealingly engaging said valve member, one end of said outer periphery, in the relaxed condition of the seal means, having a diameter less than the inner diameter of said shoulder, and the opposite end of said outer periphery, in the relaxed condition of the seal means, having a diameter greater than the inner diameter of said shoulder, whereby said seal means may be pushed axially into said groove and will snap into said groove to be retained therein by said shoulder.

2. The valve of claim 1 and also including:
a second annular groove also encircling a portion of said bore, spaced from said first mentioned annular groove and forming a second annular shoulder in said valve body; and,
second resilient, annular seal means having its entire outer periphery disposed in said second annular groove and having a surface sealingly engaging said valve member, one end of the outer periphery of the second seal means, in the relaxed condition of the second seal means, having a diameter less than the inner diameter of said second shoulder, and the opposite end of the outer periphery of the second seal means, in the relaxed condition of the second seal means, having a diameter greater than the inner diameter of said second shoulder, whereby said seal means may be pushed axially into said second groove and will snap into said second groove to be retained therein by said shoulder.

3. The valve of claim 1 wherein said resilient, annular seal means includes:
a relatively soft, resilient annular seal body; and,
a relatively rigid, resilient reinforcing ring connected with said seal body and disposed in said annular groove.

4. The valve of claim 3 wherein said reinforcing ring includes:
an annular portion encircling and connected with the outer periphery of said seal body along said one end; and,
a plurality of finger-like portions projecting from said annular portion toward said opposite end and connected with said seal body, said finger-like portions being disposed in said annular groove.

5. The valve of claim 3 wherein said reinforcing ring includes:
an annular portion partially embedded in said seal body adjacent said one end and partially disposed in said groove; and,
a plurality of finger-like portions embedded in said seal body projecting from said annular portion toward said opposite end, said finger-like portions being disposed in said annular groove.

6. The valve of claim 5 wherein said annular portion is connected to an end surface on said seal body adjacent said one end and extends in overlying relationship to an inner periphery on said annular seal body.

7. The valve of claim 1 wherein said resilient annular seal means is constructed from a high density synthetic resin.

8. The valve of claim 1 wherein said annular seal means includes a relatively flexible portion located adjacent said opposite end whereby said flexible portion is relatively easily deformed to pass said annular shoulder when said seal means is inserted into said groove.

9. A valve comprising:
a valve body including a bore extending therethrough having upstream and downstream ends, a first annular groove located relatively near said upstream end and forming a first annular flange projecting into said bore, and a second annular groove located relatively near said downstream end and forming a second annular flange projecting into said bore;
a spherical valve member located in said bore relatively between said annular flanges and having a flow port extending therethrough, said valve member being rotatable from a position wherein said port and bore are aligned to a position wherein said port and bore are disaligned;
operating means operably connected with said valve member for rotating said valve member between aligned and disaligned positions of said port and bore; and,
first and second resilient, annular seal means disposed in said first and second annular grooves, respectively, each said seal means including a surface arranged to sealingly engage said valve member and having its entire outer periphery disposed in the respective annular groove, one end of the outer periphery of each seal means, in the relaxed condition of the respective seal means, having a diameter less than the inner diameter of the respective annular flange, and the opposite end of the outer periphery of each seal means, in the relaxed condition of the respective seal means, having a diameter greater than the inner diameter of the respective annular flange, whereby each seal means may be pushed axially into its respective groove and will snap into its respective groove to be retained therein by the respective annular flange.

10. The valve of claim 9 wherein said seal means are constructed from a high density synthetic resin.

11. The valve of claim 9 wherein one of said seal means includes:
- a relatively soft, resilient annular seal body; and,
- a relatively rigid reinforcing ring including an annular portion partially embedded in said seal body extending across one end surface thereof adjacent said one end and overlying a portion of the inner periphery of said seal body and a plurality of finger-like portions projecting from said annular portion toward said opposite end and also embedded in said seal body.

12. The valve of claim 9 wherein each said seal means includes:
- a resilient, annular seal body; and,
- a relatively rigid, resilient reinforcing ring including an annular portion embedded in the outer periphery of said seal body near said one end and a plurality of finger-like portions also imbedded in said seal body near the outer periphery thereof and projecting from said annular portion toward said opposite end.

References Cited

UNITED STATES PATENTS

| | | | |
|---|---|---|---|
| 2,373,628 | 4/1945 | Gleeson | 251—315 |
| 2,762,601 | 9/1956 | Clade | 251—317 X |
| 3,009,680 | 11/1961 | Kaiser | 251—317 X |
| 3,056,577 | 10/1962 | Kulisek | 251—317 X |
| 3,108,779 | 10/1963 | Anderson | 251—317 X |
| 3,356,337 | 12/1967 | Olen | 251—315 |
| 3,035,811 | 5/1962 | Hamer | 251—317 |

M. CAREY NELSON, Primary Examiner

MICHAEL O. STURM, Assistant Examiner

U.S. Cl. X.R.

251—317